(12) United States Patent
Warnes et al.

(10) Patent No.: US 6,474,879 B1
(45) Date of Patent: Nov. 5, 2002

(54) POST ASSEMBLY METALLIZATION OF A DEVICE TO FORM HERMETIC SEAL

(75) Inventors: Christopher M. Warnes, Suffolk (GB); Richard C. E. Durrant, Suffolk (GB)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/634,079

(22) Filed: Aug. 8, 2000

(51) Int. Cl.[7] .................................................. G02B 6/36
(52) U.S. Cl. ........................................................ 385/80
(58) Field of Search ............................. 385/80, 94, 77, 385/78, 83, 85

(56) References Cited

U.S. PATENT DOCUMENTS

| | | | |
|---|---|---|---|
| 3,864,018 A | * 2/1975 | Miller ........................... | 385/98 |
| 4,119,363 A | 10/1978 | Camlibel et al. | |
| 4,488,773 A | * 12/1984 | Wagner | |
| 4,615,031 A | * 9/1986 | Eales et al. ..................... | 385/94 |
| 4,756,592 A | * 7/1988 | Sasayama et al. ............. | 385/94 |
| 5,386,488 A | * 1/1995 | Oikawa ........................ | 385/92 |
| 5,448,672 A | * 9/1995 | Blonder ........................ | 385/94 |
| 5,450,515 A | * 9/1995 | Bechtel et al. ................. | 385/94 |
| 5,535,296 A | * 7/1996 | Uchida ......................... | 385/94 |
| 5,664,043 A | 9/1997 | Donaldson et al. .......... | 385/138 |
| 5,764,833 A | * 6/1998 | Kakii ........................... | 385/54 |
| 5,970,194 A | 10/1999 | Dunn et al. ................... | 385/95 |
| 6,145,731 A | * 11/2000 | Tower ....................... | 228/122.1 |
| 6,220,766 B1 | * 4/2001 | Yeandle ........................ | 385/94 |

FOREIGN PATENT DOCUMENTS

| | | |
|---|---|---|
| GB | 2 003 294 A | 3/1979 |
| GB | 2 064 862 A | 6/1981 |
| GB | 2 124 402 A | 2/1984 |
| GB | 2 215 082 A | 9/1989 |

* cited by examiner

*Primary Examiner*—Neil Abrams
(74) *Attorney, Agent, or Firm*—Karl D. Kovach (57) ABSTRACT

An assembly including a fiber optic cable assembled with a one-piece ferrule where a gap exists between the fiber optic cable and the ferrule. When the fiber optic cable is mounted to the ferrule, the optical fiber is positioned within a small opening and the sheath is positioned within a large opening of the ferrule. The gap exists between the optical fiber and the small opening. The metallic material is then adhered to a portion of the optical fiber and to a portion of the ferrule so as to form the hermetic seal at the gap. The layer of the metallic material can be deposited by way of a metal vapor deposition process. Another assembly may include multiple fiber optic cables trapped between two substrates where any gaps formed between the two substrates are hermetically sealed with a metallic material.

3 Claims, 9 Drawing Sheets

POST ASSEMBLY METALLIZATION OF A DEVICE TO FORM HERMETIC SEAL

BACKGROUND OF THE INVENTION

1. Field of the Invention

The present invention pertains to a device package wall feedthrough assembly which is metallized. The invention more particularly concerns a fiber optic device package wall feedthrough which is metallized post assembly.

2. Discussion of the Background

Components found inside optical devices such as optical transmitters, detectors, modulators, amplifiers including diodes and exposed, uninsulated conductors, such as wire bonds, may be susceptible to environmental contaminates and/or residual assembly organics such as resins or fluxes which can result in galvanic corrosion and other failure modes which cause the optical device to no longer operate in an acceptable manner. Thus, the interior region of the optical device may be either evacuated or filled with an inert element such as nitrogen. Typically, the device housings are then hermetically sealed. However, a problem exists as to how the optical signal will penetrate the housing whilst maintaining hermeticity and without unacceptable degradation in the transmission properties of the optical signal. A number of general solutions have been developed to solve the problem which typically involve the metallization of an optical fiber over a portion of its length prior to assembly with the feedthrough components which then allow for the formation of a hermetic seal during the assembly process typically through the use of a soft solder alloy. These designs may also take account of the stresses created during assembly process and give due consideration to the reduction of these stresses through design and assembly methodology. Such considerations are of particular interest when employing polarization maintaining fibers. The feedthrough is then subsequently soft soldered into a feedthrough tube that has previously been sealed typically by brazing, into an aperture extending through the device package wall.

Manufacturing such a device is expensive due to the multiple metallizing steps and assembly steps which are followed by soldering steps. Further the current feedthrough designs typically only take account of a single optical fiber within the assembly. There is a growing need to be able to provide multifiber feedthrough designs. With current design approaches and assembly methodologies these are likely to be expensive and difficult to produce.

Therefore, there is a need for a hermetic seal between an optical fiber or fibers and the package wall of a device which provides design flexibility, is easy to manufacture, is cost effective and which does not significantly degrade the transmission properties of the optical signal or signals that the optical fiber or fibers contain.

SUMMARY OF THE INVENTION

Therefore, it is an object of the present invention to provide a process and assembly methodolgy which can provide for a hermetic seal between an optical fiber and a package wall.

It is still another object of the invention to provide a metallized fiber optic cable which requires a minimal number of parts and processes.

Yet another object of the invention is to provide a metallized fiber optic cable which is metallized after it is assembled to a sleeve.

It is a further object of the invention to provide a metallized fiber optic cable which is easy to install.

Another object of the invention is to provide a metallized fiber optic cable which is inexpensive to manufacture.

In one form of the invention, the assembly includes a first element having a first surface and a second element having a second surface. The first element positioned adjacent to and contacting the second element so as to form a gap between the first element and the second element. A layer of a metallic material is then adhered to a portion of the first surface of the first element and to a portion of the second surface of the second element so as to form a hermetic seal between the first element and the second element at the gap.

In another form of the invention, the assembly includes a first element having a first surface and a second element having a second surface. The first surface includes first, second, and third portions. The second surface includes fourth, fifth, and sixth portions. The second surface of the second element facing the first surface of the first element, and the first portion of the first surface contacts the fourth portion of the second surface so as to form a gap between the first element and the second element. A layer of a metallic material is then adhered to the third portion of the first surface of the first element and to the sixth portion of the second surface of the second element so as to form a hermetic seal at the gap.

In still another form of the invention, the assembly includes a fiber optic cable and a ferrule. The fiber optic cable includes an optical fiber substantially surrounded by a sheath. The optical fiber is made of an optically transparent material. The sheath is made of a polymer material. The ferrule includes a large opening and a small opening. The ferrule is made of a ceramic material. When the fiber optic cable is mounted to the ferrule, the optical fiber is positioned within the small opening and the sheath is positioned in the large opening. A gap is formed between the optical fiber and the small opening. A layer of a metallic material is adhered to a portion of the optical fiber and the ferrule so as to form a hermetic seal at the gap.

In still yet another form of the invention, the assembly includes a process for metallizing two elements to each other. The process includes the first step of placing a first element adjacent to the second element so as to form a device. The device includes a gap between the first element and the second element. Following the first step is the second step. The second step includes the step of adhering a layer of a metallic material on the device so as to form a hermetic seal at the gap.

Thus, the invention is superior to existing devices or processes for passing a fiber optic cable through a wall of a detector and to hermetically seal it thereto. The invention reduces the number of parts and processes required to provide the hermetic seal. Furthermore, the invention provides a device which is inexpensive to produce, while at the same time being easy to manufacture, install, and use. These and other features of the invention are set forth below in the following detailed description of the presently preferred embodiments.

DETAILED DESCRIPTION OF THE PRESENTLY PREFERRED EMBODIMENTS

Figure 4:
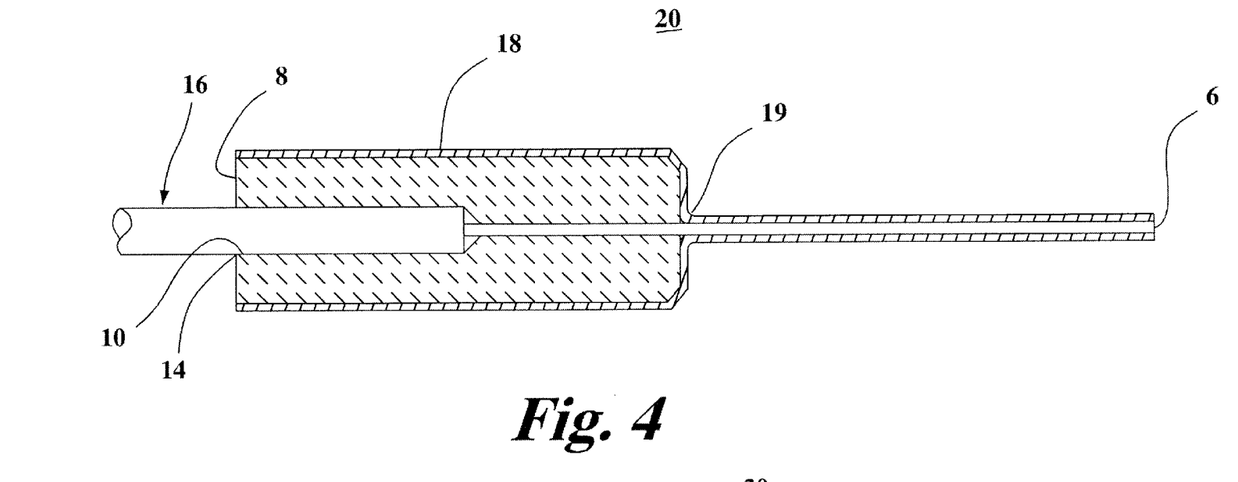
FIG. 4 is a side view, shown partially in cross-section, of the cable-in-ferrule assembly of FIG. 3, where the cable-in-ferrule is metallized so as to form a metallized cable-in-ferrule assembly.
Figure 5:
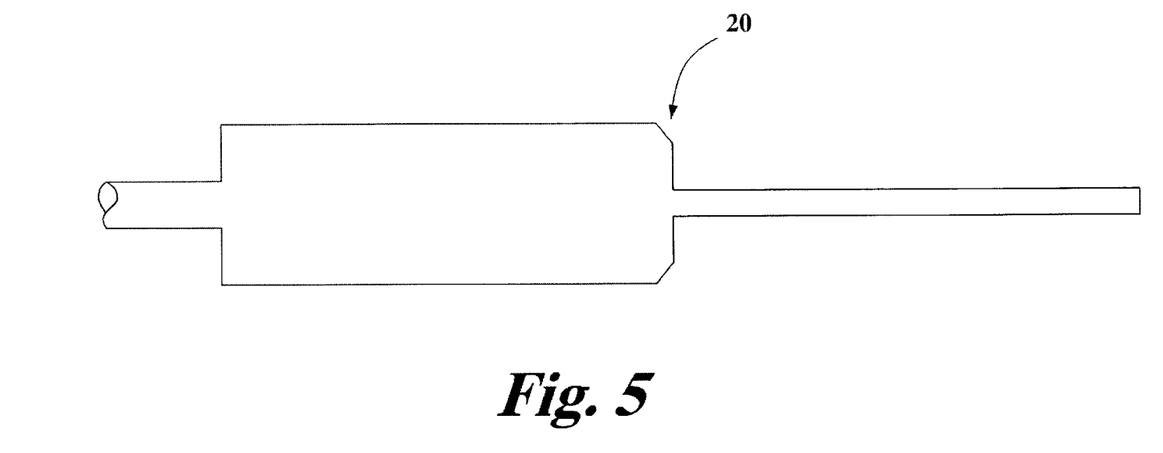
FIG. 5 is a side view of the metallized cable-in-ferrule assembly of FIG. 4.

Referring now to the drawings, wherein like reference numerals designate identical or corresponding parts throughout the several views, and more particularly to FIGS. 4 and 5 thereof, a first embodiment of the present invention is a metallized cable-in-ferrule assembly 20.

Figure 1:
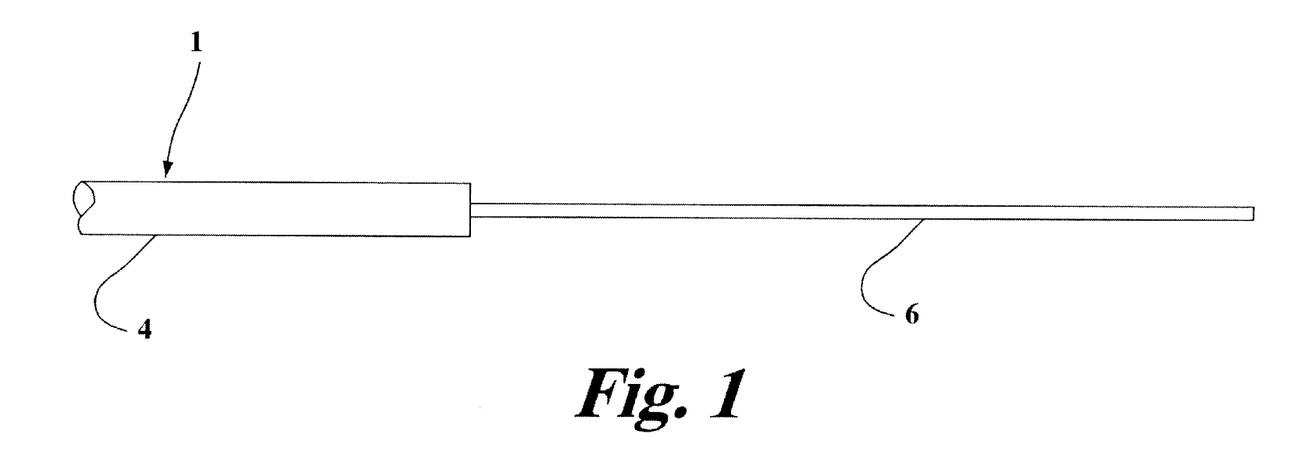
FIG. 1 is a side view of a fiber optic cable.

FIG. 1 is a side view of a fiber optic cable 1. The fiber optic cable 1 includes an optical fiber or core 6 covered with a sheath 4. The sheath 4 is made of a polymer material having electrical insulative characteristics. The optical fiber 6 is typically made of glass or, generically, of optically transparent fusion products of inorganic materials that have been cooled to a rigid state without crystallizing. Typically, the main constituent of glass is silica, $SiO_2$.

Figure 2:
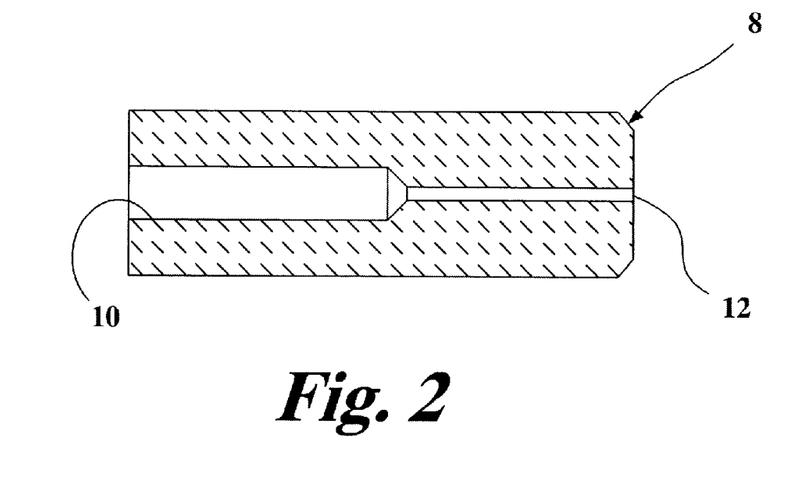
FIG. 2 is a cross-sectional, side view of a ferrule.

FIG. 2 is a cross-sectional, side view of a ferrule 8. The ferrule 8 has one end bored out so as to form a large aperture 10 and the second end is bored out so as to form a small aperture 12. The large aperture 10 and the small aperture 12 are in fluidic communication with each other and are substantially coaxial with each other. The ferrule 8 is axisymmetric about the coaxial longitudinal axes (not shown) of the small and large apertures, thus forming a generally cylindrical shape. The ferrule 8 is typically made of a ceramic material. Preferably, the ceramic material is made of zirconia, $ZrO_2$.

Figure 3:
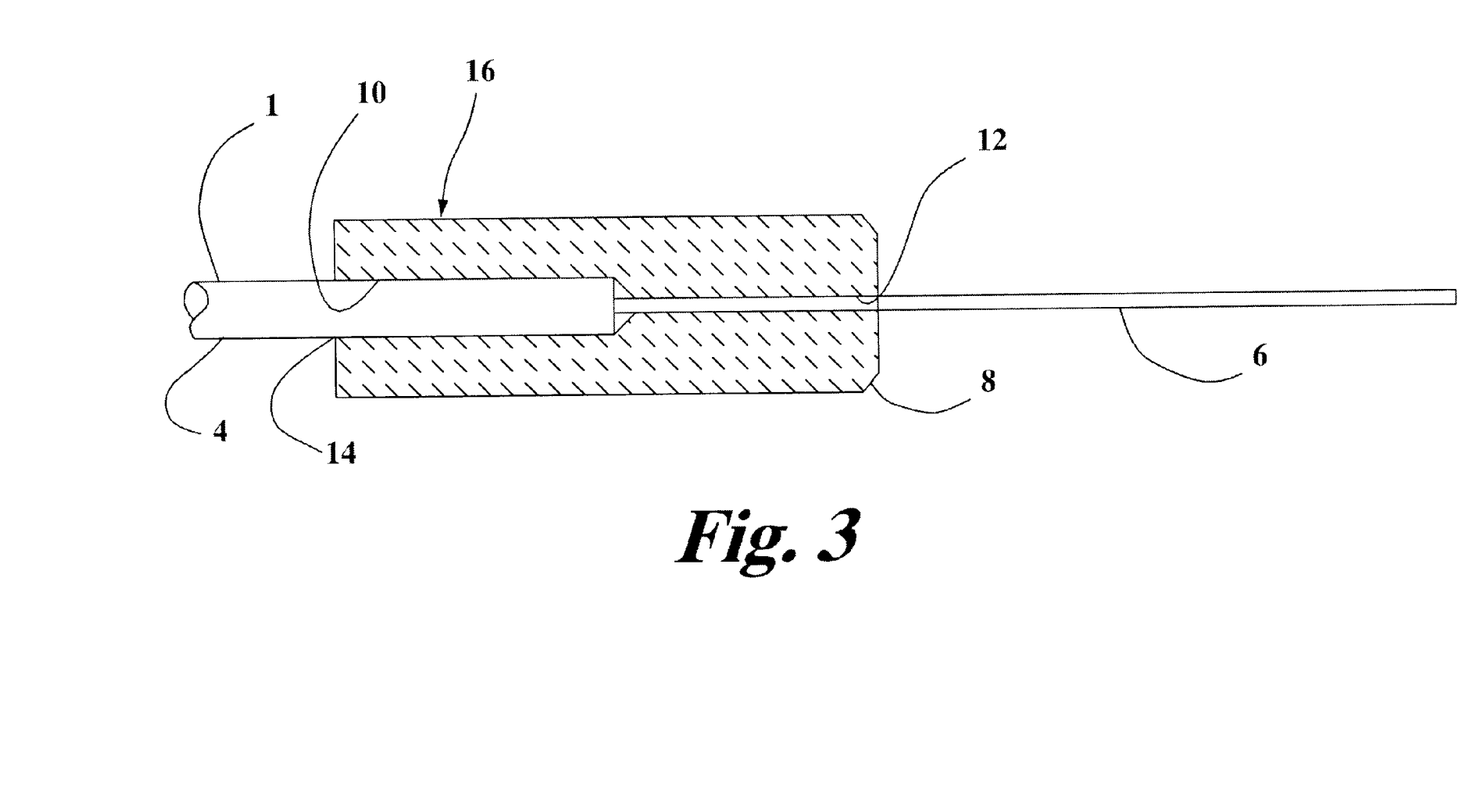
FIG. 3 is a side view, shown partially in cross-section, of the fiber optic cable of FIG. 1 mounted in the ferrule of FIG. 2 so as to form a cable-in-ferrule assembly.
Figure 10:
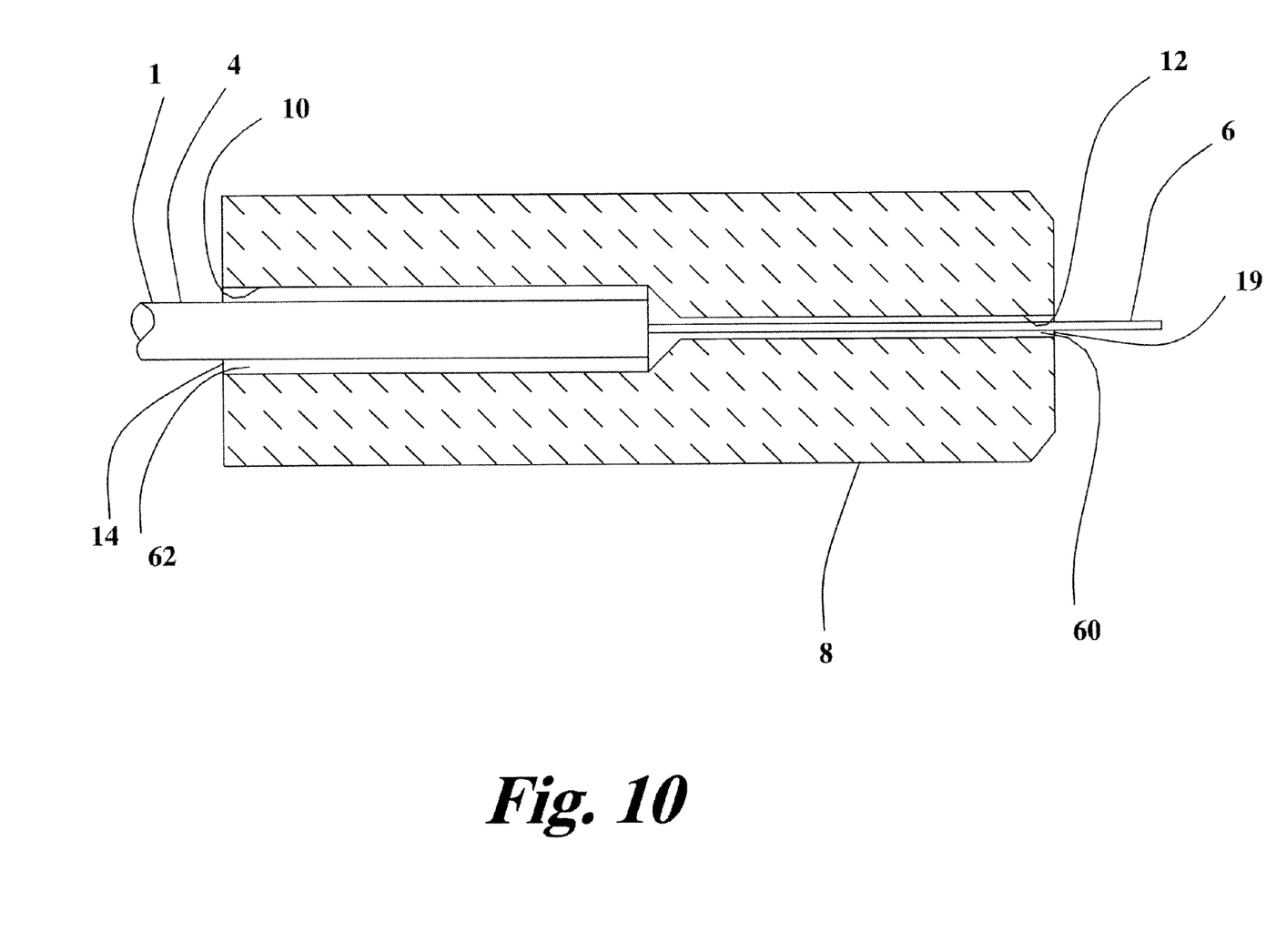
FIG. 10 is an expanded side view of the device of FIG. 3.
Figure 11:
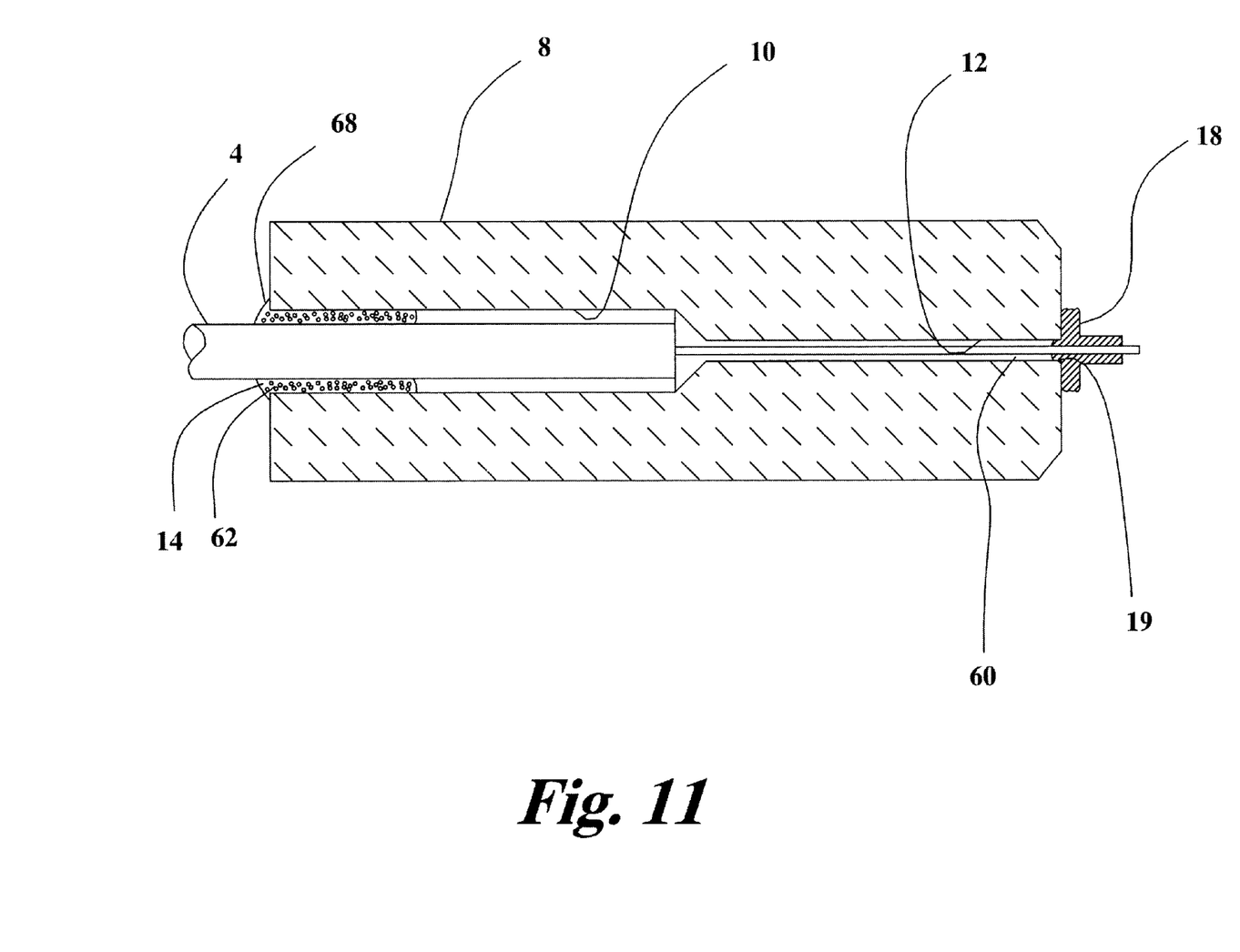
FIG. 11 is a view of the device as shown in FIG. 10 with partial sections showing the metallic material and the epoxy.

FIG. 3 is a side view, which is shown partially in cross-section, of the fiber optic cable 1 assembled with the ferrule 8. As shown in FIG. 3, the optical fiber 6 passes through both the large aperture 10 and the small aperture 12 of the ferrule 8. A portion of the optical fiber 6 is positioned within the small aperture 12. The sheath 4 of the fiber optic cable 1 is positioned within the large aperture 10 of the ferrule 8. In order to retain the fiber optic cable 1 in the ferrule 8, a suitable epoxy material 68 is placed at a gap 62 at the interface 14 between the sheath 4 and the large aperture 10. The assembly of the fiber optic cable 1 and the ferrule 8 results in a cable-in-ferrule assembly 16. FIG. 10 is a partially expanded view of FIG. 3 which shows the gap 62 at the interface 14. FIG. 11 shows the epoxy material 68 positioned in the gap 62 of the device of FIG. 10.

FIG. 4 is a side view, which is shown partially in cross-section, of the cable-in-ferrule assembly 16. The cable-in-ferrule assembly 16 has been metallized with a layer of a metallic material 18. The metallic material 18 deposited at a gap 60 at the interface 19 between the small aperture 12 of the ferrule 8 and the optical fiber 6 of the fiber optic cable I forms a hermetic seal. The resulting structure forms a metallized cable-in-ferrule assembly 20. FIG. 10 is a partially expanded view of FIG. 3 which shows the gap 60 at the interface 19. FIG. 11 shows a portion of the metallic material 18 positioned in the gap 60 of the device of FIG. 10.

Figure 6:
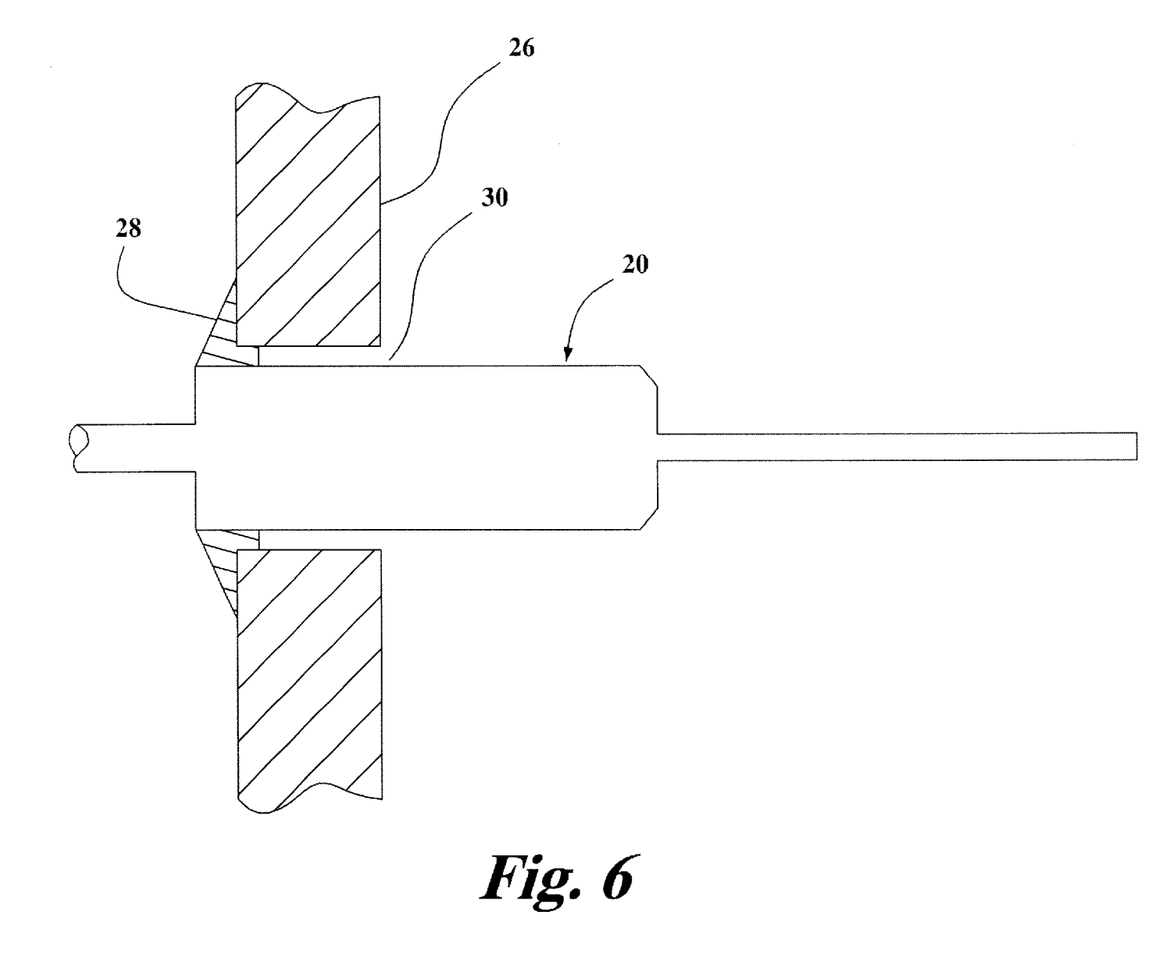
FIG. 6 is a side view, which is shown partially in cross section, of the metallized cable-in-ferrule assembly of FIG. 5 soldered to a wall of an instrument or other device or structure.

FIG. 6 is a side view, which is shown partially in cross section, of the metallized cable-in-ferrule assembly 20 fitted into an aperture or opening of a metallic wall 26 of a vessel or other devices. The metallic surface of the metallized cable-in-ferrule assembly 20 allows the assembly to be soldered to the metallic wall 26. FIG. 6 shows solder material 28 at the interface between the metallized cable-in-ferrule assembly 20 and the metallic wall 26. The solder material 28 provides a hermetic seal at that interface. Additionally, or in the alternative, soldered 28 may be provided at the interface 30. Preferably, the metallic material 18 is applied by way of a metal vapor deposition process. Other deposition processes such as hot dipping, flame spraying, and electroless plating can be employed.

Figure 7:
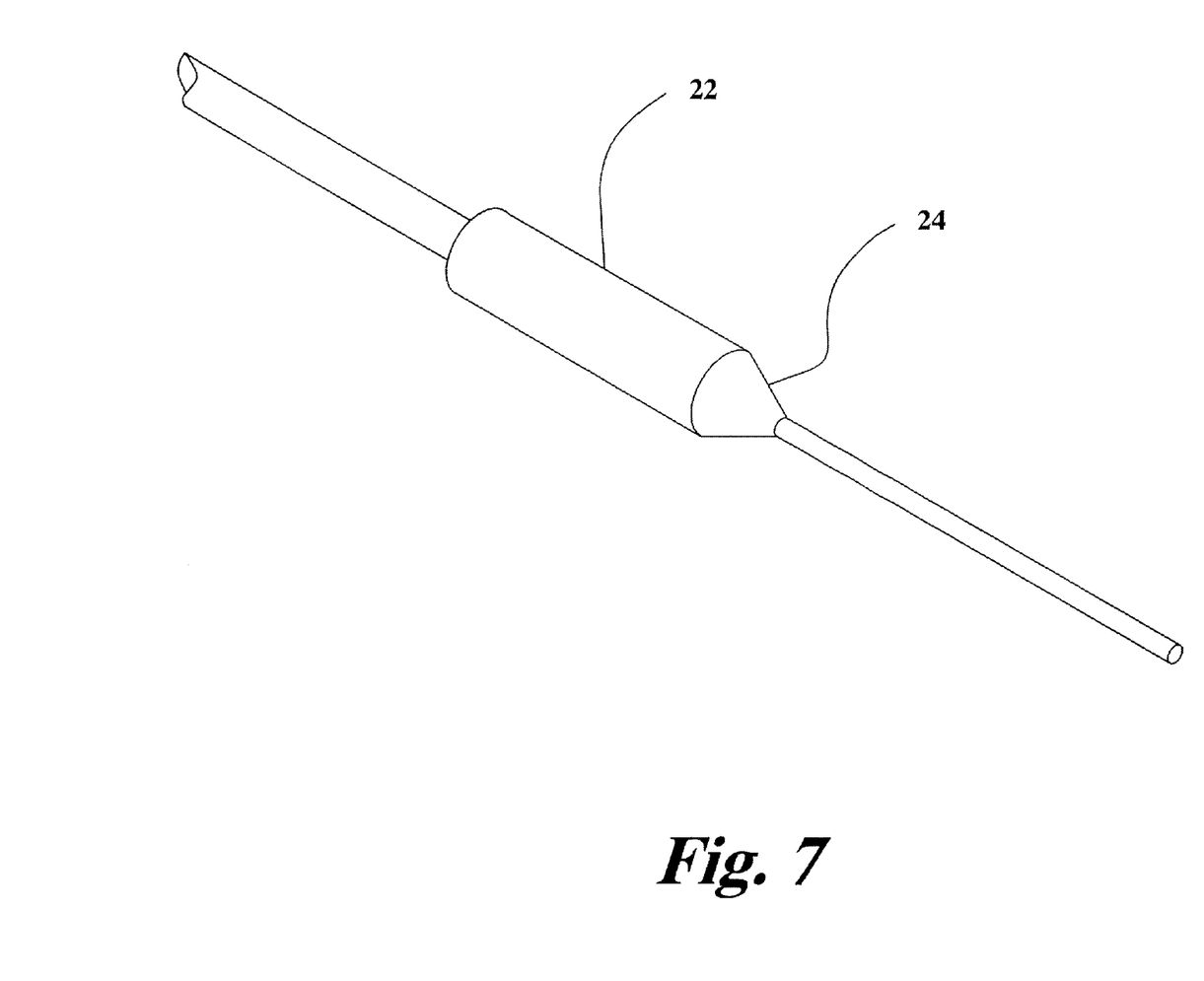
FIG. 7 is a perspective view of another embodiment of the metallized cable-in-ferrule assembly.

FIG. 7 is a perspective view of a second embodiment of the invention 22. The second embodiment metallized cable-in-ferrule assembly 22 has a blended seal of metallic material 24 at the junction of the optical fiber and the ferrule.

Figure 8:
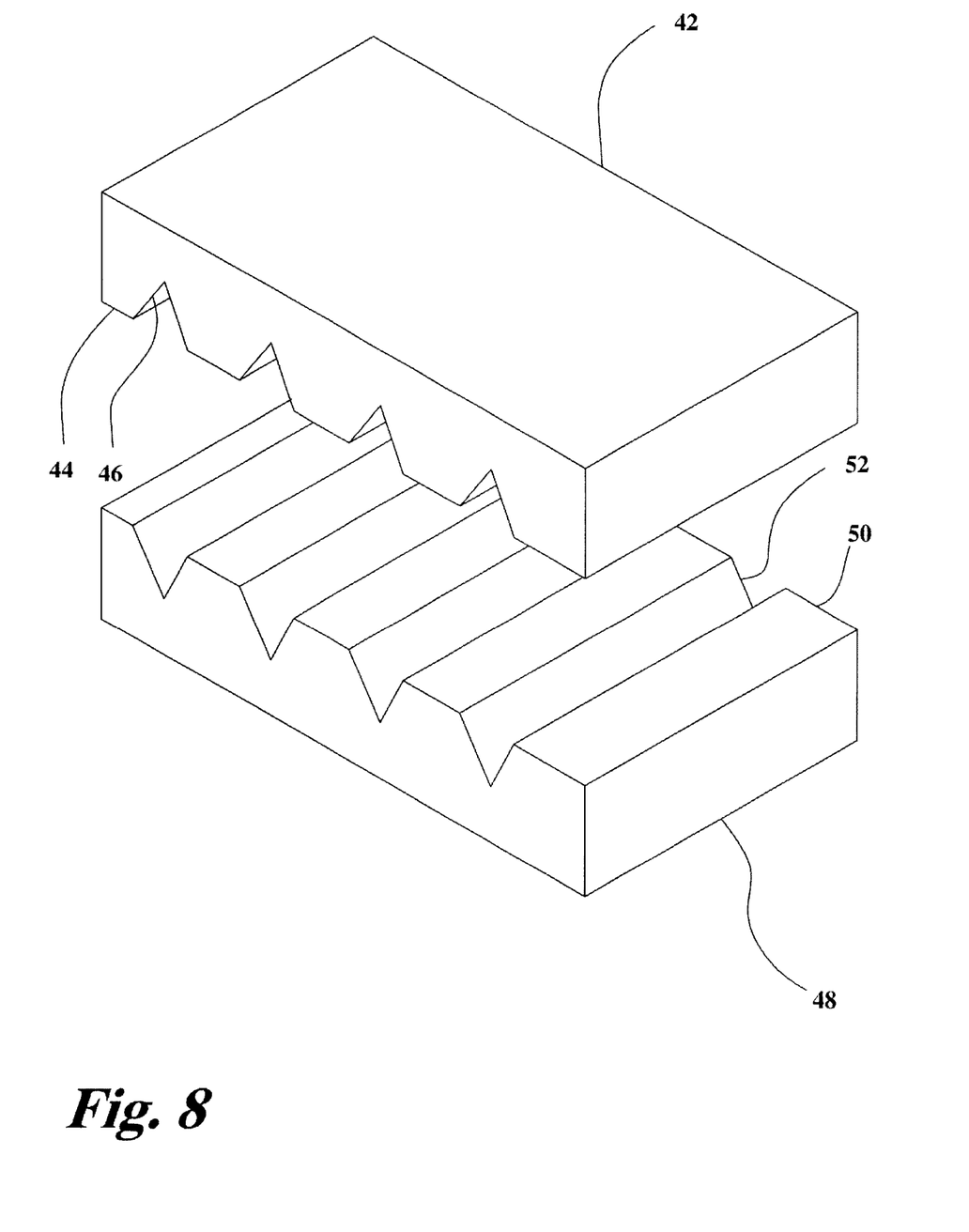
FIG. 8 is a perspective view of two substrates having v-grooves formed therein.
Figure 9:
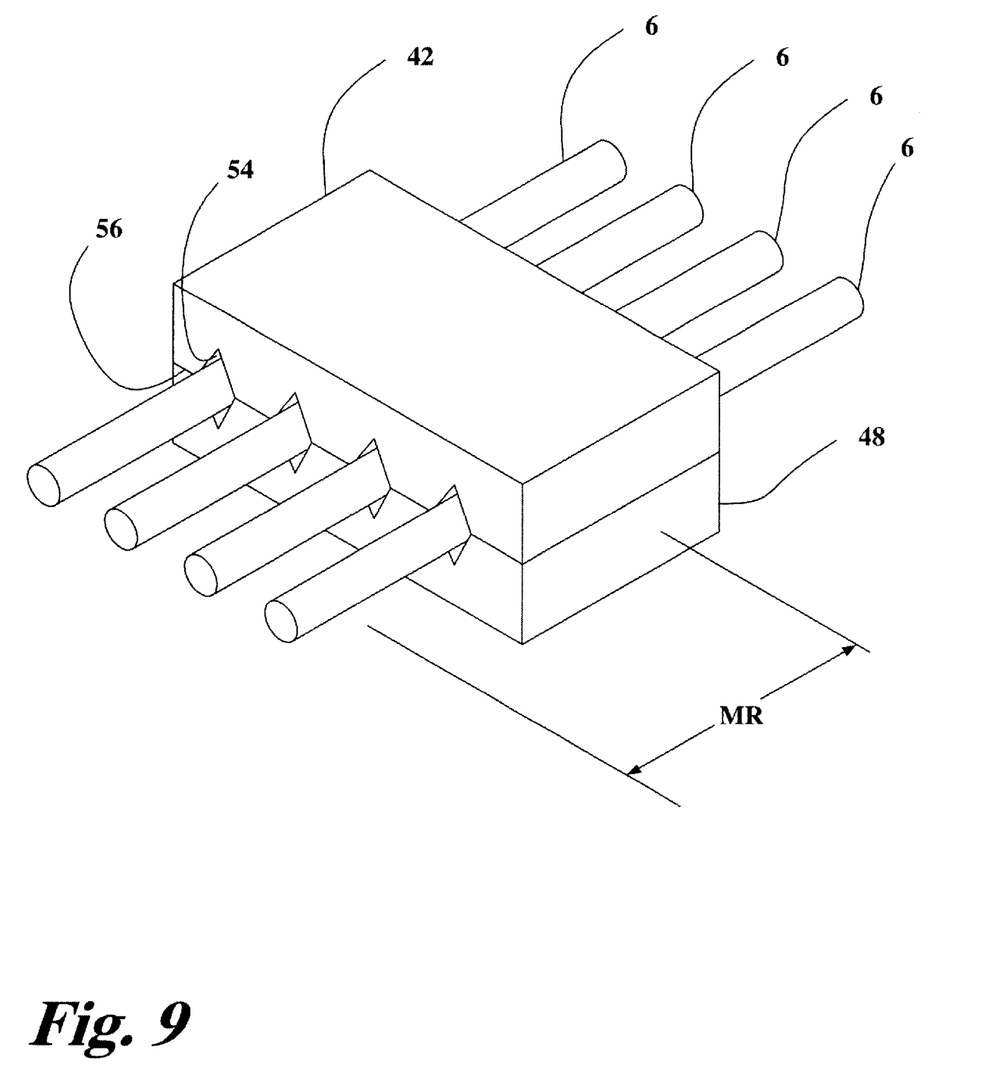
FIG. 9 is a perspective view of a multi-fiber feedthrough assembly utilizing the two substrates of FIG. 8.

FIG. 9 is a perspective view another embodiment of the invention which is a multi-fiber feedthrough assembly 40. The multi-fiber feedthrough assembly 40 includes a first substrate 42 and a second substrate 48, as shown in FIG. 8. The first substrate 42 has a relatively smooth surface 44 which may contain portions which are not absolutely flat and which may have an uneven surface roughness. The first substrate 42 has v-grooves 46 formed therein. The second substrate 48 has a relatively smooth surface 50 which may contain portions which are not absolutely flat and which may have an uneven surface roughness. The second substrate 48 has v-grooves 52 formed therein. The first and second substrates 42, 48 are preferably formed of a ceramic material.

In practice, two or more optical fibers or cores 6 are placed between the first and second substrates 42, 48. The v-grooves 46, 52 are aligned so as to trap the cores 6 between the v-grooves 46, 52 of the first and second substrates 42, 48 as the first and second substrates 42, 48 are urged towards each other until portions of surfaces 44 and 50 contact each other or are held together by an adhesive.

The assembly of the first and second substrates 42, 48 and the cores 6 are metallized. FIG. 9 shows a metallization region MR on the first and second substrates 42, 48 and cores 6 which are metallized. The metallization layer seals any gap 56 present between the first substrate 42 and the second substrate 48 and between any gap 54 present between the core 6 and the first and second substrates 42, 48. The seals created are hermetic seals. Thus, the multi-fiber feedthrough assembly 40 is formed. The entire assembly 40 can then be soldered to the wall of a device or vessel so as to permit multiple optical fibers to gain access through the wall into the interior of the vessel.

In another embodiment, the first and second substrates 42 and 48 can act as a feedthrough for a single core 6.

Obviously, numerous modifications and variations of the present invention are possible in light of the above teachings. It is therefore to be understood that within the scope of the appended claims, the invention may be practiced otherwise than as specifically described herein.

What is claimed is:

1. An assembly comprising:

a fiber optic cable having an optical fiber substantially surrounded by a sheath, the optical fiber made of an optically transparent material, the sheath made of a polymer material, the sheath having an outside diameter, and the optical fiber having an outside diameter, and wherein the outside diameter of the sheath being greater than the outside diameter of the optical fiber;

a ferrule having a first aperture and a second aperture, the first aperture being in fluidic communication with the second aperture, the ferrule only made of a one-piece ceramic material, and wherein, when the fiber optic cable is mounted to the ferrule, the optical fiber is positioned within the second aperture and the sheath is positioned within the first aperture, and wherein a first gap is formed between the optical fiber and the second aperture, the ferrule having a substantially constant outside diameter dimension, and the first aperture and the second aperture being substantially co-linear, and wherein an inside diameter of the first aperture is greater than the outside diameter of the sheath, and wherein an inside diameter of the second aperture is greater than the outside dimension of the optical fiber, and wherein a second gap is formed between the sheath and first aperture;

a layer of a metallic material adhered to a portion of the optical fiber and to a portion of the ferrule so as to form a hermetic seal at the first gap; and an epoxy material positioned in the second gap so as to bond the first aperture to the sheath.

2. The assembly according to claim 1 wherein the ceramic material of the ferrule is zirconia.

3. The assembly according to claim 2 wherein the layer of the metallic is deposited on the portion of the optical fiber and on the portion of the ferrule by a metal vapor deposition process.

* * * * *